United States Patent
Gagnon

(10) Patent No.: US 8,481,602 B2
(45) Date of Patent: Jul. 9, 2013

(54) HOW TO PRODUCE SYNTHETIC GASOLINES OR SYNTHETIC DIESELS USING ONLY NATURAL GAS AS RAW MATERIAL

(76) Inventor: Robert Gagnon, Sherbrooke (CA)

( * ) Notice: Subject to any disclaimer, the term of this patent is extended or adjusted under 35 U.S.C. 154(b) by 296 days.

(21) Appl. No.: 13/068,624

(22) Filed: May 17, 2011

(65) Prior Publication Data

US 2012/0291341 A1    Nov. 22, 2012

(51) Int. Cl.
*C07C 27/00* (2006.01)
(52) U.S. Cl.
USPC ............... 518/721; 518/700; 518/719
(58) Field of Classification Search
USPC ........................................ 518/700, 719, 721
See application file for complete search history.

(56) References Cited

U.S. PATENT DOCUMENTS 6,774,149 B1 *    8/2004    Gagnon .................. 518/721

* cited by examiner

*Primary Examiner* — Jafar Parsa

(57) ABSTRACT

My process does not convert natural gas into compressed natural gas, does not convert natural gas into liquified natural gas but uses 2 new chemical formulas to convert natural gas into synthetic gasolines or into synthetic diesels. After producing CO through a technology of partial combustion, my process improves Fischer-Tropsch process using CH4 instead of H2, following 2 new chemical equations and adding salt, NaCl, to an iron, FeO, catalyst or to any other catalyst capable of generating hydrocarbons. Instead of producing a large variety of synthetic hydrocarbons like other processes do, my process delivers only synthetic gasolines following 5 CH4+2 CO=C7H16+2 H2O or only synthetic diesels following 11 CH4+5 CO=C16H34+5 H2O thanks to the addition of salt to an iron catalyst or to any other catalyst. No oil refining needed. Because natural gas is the cleanest hydrocarbon, my process produces clean synthetic gasolines or clean synthetic diesels. Because the prices of natural gas are very low, my process produces clean synthetic gasolines or clean synthetic diesels at very low costs.

2 Claims, No Drawings

HOW TO PRODUCE SYNTHETIC GASOLINES OR SYNTHETIC DIESELS USING ONLY NATURAL GAS AS RAW MATERIAL

FIELD OF THE INVENTION

The present invention is directed to a process for producing synthetic hydrocarbons from methane, in particular, to a process for producing synthetic gasolines or synthetic diesel from methane through catalytic hydrogenation.

BACKGROUND OF THE INVENTION

Converting carbon monoxide into synthetic hydrocarbon through catalytic hydrogenation is a process invented by Mr. Fischer and Mr. Tropsch in 1925. Fischer-Tropsch produced a real industrial synthesis of hydrocarbons and oils under normal pressure with a cobalt catalyst and thorine. These processes were improved in 1930 and during world war 2 using nickel-cobalt catalyst. Many companies improved the F-T process since then, using costly alloy catalysts without succeeding to eliminate problems of instability, effectiveness, profitability and necessity of refining. Adding salt, Nacl, to an iron catalyst or to a nickel catalyst solved part of these problems. See U.S. Pat. Nos. 6,774,149 B1 and 6,987,134 B1. About all F-T processes produce a large variety of hydrocarbons. This is why the necessity of refining stands. I discovered a process for producing specific synthetic gasolines or specific synthetic diesels eliminating the necessity of refining.

SUMMARY

We can divide hydrocarbons in 3 groups:
small numbers of carbons=CH4 to C4H10 natural gases.
medium numbers of carbons=C5H12 to C10H22 gasolines.
large numbers of carbons=C13H28 to C19H40 diesels.

If we compress or liquefy natural gases, we keep the same numbers of carbons. To produce gasolines or diesels using only natural gas, CH4, we must convert hydrocarbons with small numbers of carbons into hydrocarbons with medium or large numbers of carbons. In order to convert natural gas into specific synthetic gasolines or specific synthetic diesels, we must use specific synthesis gas containing specific proportion of CH4. The Fischer-Tropsch process uses a synthesis gas, H2+CO, to produce hydrocarbons following these proportions: 15 H2 (14%)+7 CO (86%)=C7H16 (44%)+7 H2O (56%). With any temperature, with any pressure or with any catalyst, the same proportions of the synthesis gas, 14% H2+86% CO, produces all groups of hydrocarbons, not only C7H16, even if we add salt, NaCl, to catalysts. I discovered that if we remove H2 and use CH4 instead, we get a new synthesis gas with specific properties. The synthesis gas, H2+CO, in the F-T formula becomes CH4+CO. With a new synthesis gas containing 59% of CH4+41% of CO, we produce only a "medium number" group of hydrocarbons, gasolines. With a new synthesis gas containing 56% of CH4+44% of CO, we produce only a "large number" group of hydrocarbons, diesels.

Adding salt, NaCl, to the iron catalyst, or to any other metal catalyst we may use, is still essential because chlorine opens chemical chains extracting H2 from CH4 and sodium prevents crystals of oxygen from covering the iron catalyst, aiming chemical reactions toward production of a specific group of hydrocarbons.

Doing so, the chemical equation to produce synthetic gasolines:

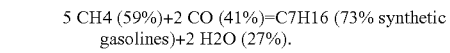

5 CH4 (59%)+2 CO (41%)=C7H16 (73% synthetic gasolines)+2 H2O (27%).

Doing so, the chemical equation to produce synthetic diesels:

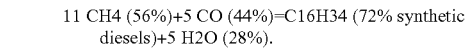

11 CH4 (56%)+5 CO (44%)=C16H34 (72% synthetic diesels)+5 H2O (28%).

"How to produce gasolines or diesels using only natural gas" also means that we must find a synthesis gas to produce CO. I discovered that we can produce CO through partial combustion of a synthesis gas having the exact proportions of 50% CH4+50% O2. We burn this synthesis gas in vacuum to produce 87% CO and 13% H2. We separate CO from H2 and we combine this CO to CH4 in order to have synthesis gases described above.

DETAILED DESCRIPTION

Production of CO with CH4
In a vacuum, burn 50% CH4 with 50% O2 following this chemical equation:

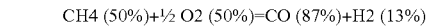

CH4 (50%)+½ O2 (50%)=CO (87%)+H2 (13%)

Separate CO from H2
Preparation of Synthesis Gases
Mix 59% of CH4 with 41% of CO for the production of gasolines.
Mix 56% of CH4 with 44% of CO for the production of diesels.
Production of Gasolines
Follow this chemical equation: 59% CH4+41% CO=73% gasolines+27% H2O.
Temperatures=300° C.- 350° C. preferably 330° C.
Pressures=450 p.s.i.-500 p.s.i. preferably not lower than 450 p.s.i.
Catalysts=mix iron catalyst, Fe or FeO, with salt catalyst, NaCl, preferably 2 or 3 times more salt than iron. Other "generating hydrocarbon"catalyst like nickel or cobalt mixed with salt do the work.
Length=as long as the interior pressure is decreasing and stabilized. When the interior pressure has finished decreasing=chemical reactions have finished.
Separate gasolines from water.
Production of Diesels
Follow this chemical equation: 56% CH4+44% CO=72% diesels+28% H2O.
Temperatures=200° C.-250° C. preferably 230° C.
Pressures=450 p.s.i.-500 p.s.i. preferably not lower than 450 p.s.i.
Catalysts=mix iron catalyst, Fe or FeO, with salt catalyst, NaCl, preferably 2 or 3 times more salt than iron. Other "generating hydrocarbon" catalysts like nickel or cobalt mixed with salt do the work.
Length=as long as the interior pressure is decreasing and stabilized. When the interior pressure has finished decreasing=chemical reactions have finished.
Separate diesels from water.

The invention claimed is:
1. A process for producing synthetic gasolines by reacting 59% methane, CH4, with 41% carbon monoxide, CO, in the presence of a catalyst being made of about ⅔ of crushed salt, NaCl, and of about ⅓ of crushed iron, FeO, characterized by the circulation of methane, CH4, and carbon monoxide, CO, in the presence of iron+salt, ⅓ FeO+⅔ NaCl, catalyst at a constant temperature of about 300° C.-350° C., at a constant pressure of about 450-500 p.s.i.

2. A process for producing synthetic diesels by reacting 56% methane, CH4, with 44% carbon monoxide, CO, in the presence of a catalyst being made of about ⅔ of crushed salt, NaCl, and of about ⅓ of crushed iron, FeO, characterized by the circulation of methane, CH4, and carbon monoxide, CO, in the presence of iron+salt, ⅓ FeO+⅔ NaCl, catalyst at a constant temperature of about 200° C.-250° C., at a constant pressure of about 450-500 p.s.i.

* * * * *